(12) United States Patent
Krishnamurthy et al.

(10) Patent No.: US 10,841,172 B2
(45) Date of Patent: Nov. 17, 2020

(54) NETWORK FABRIC VISUALIZATION AND MANAGEMENT

(71) Applicant: Cisco Technology, Inc., San Jose, CA (US)

(72) Inventors: Venkatabalakrishnan Krishnamurthy, Cupertino, CA (US); Liqin Dong, San Jose, CA (US); Sachin Vijay Vishwarupe, Santa Clara, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 15/992,592

(22) Filed: May 30, 2018

(65) Prior Publication Data

US 2019/0372858 A1 Dec. 5, 2019

(51) Int. Cl.
*H04L 12/24* (2006.01)
*H04L 12/715* (2013.01)

(52) U.S. Cl.
CPC ............ *H04L 41/145* (2013.01); *H04L 41/22* (2013.01); *H04L 45/64* (2013.01)

(58) Field of Classification Search
CPC ........ H04L 41/145; H04L 41/22; H04L 45/64
See application file for complete search history.

(56) References Cited

U.S. PATENT DOCUMENTS

| | | | |
|---|---|---|---|
| 7,149,975 B1 * | 12/2006 | Johnson | H04L 41/22 715/734 |
| 9,660,897 B1 | 5/2017 | Gredler | |
| 2003/0046390 A1 * | 3/2003 | Ball | H04L 41/12 709/224 |
| 2003/0091165 A1 * | 5/2003 | Bearden | H04L 41/0213 379/88.08 |
| 2004/0120270 A1 * | 6/2004 | Saxon | H04L 12/42 370/258 |
| 2014/0192677 A1 * | 7/2014 | Chew | H04L 69/14 370/254 |

(Continued)

FOREIGN PATENT DOCUMENTS

CN 105871721 A 8/2016

OTHER PUBLICATIONS

Cengiz Alaettinoglu, "BGP-LS: What Is It Good For?", https://www.packetdesign.com/blog/what-is-bgp-Is-what-is-it-good-for/, Mar. 24, 2016, 3 pages.

(Continued)

*Primary Examiner* — Steven H Nguyen
(74) *Attorney, Agent, or Firm* — Edell, Shapiro & Finnan, LLC (57) ABSTRACT

In one example embodiment, a server, using Border Gateway Protocol Link-State, obtains, from a particular network node of a plurality of network nodes in a network fabric configured for segment routing, network topology information of the plurality of network nodes including segment identifiers of the plurality of network nodes. The particular network node gathered the network topology information from other network nodes of the plurality of network nodes using an underlay routing protocol. Based on the network topology information, the server generates a visualization of a topology of the network fabric including the plurality of network nodes and a plurality of links connecting the plurality of network nodes.

20 Claims, 8 Drawing Sheets

(56) References Cited

U.S. PATENT DOCUMENTS

| | | | |
|---|---|---|---|
| 2015/0271034 A1* | 9/2015 | Kanna | H04L 43/04 370/252 |
| 2017/0005922 A1 | 1/2017 | Tantsura et al. | |
| 2017/0257684 A1 | 9/2017 | Anand et al. | |

OTHER PUBLICATIONS

S. Previdi, et al., "BGP-LS extensions for Segment Routing BGP Egress Peer Engineering", draft-ietf-idr-bgpls-segment-routing-epe-14, Network Working Group, Internet-Draft, Dec. 19, 2017, 21 pages.

F. Paolucci, et al., "Interoperable Multi-Domain Delay-aware Provisioning using Segment Routing Monitoring and BGP-LS Advertisement", ECOC 2016, 42nd European Conference and Exhibition on Optical Communications, Sep. 18-22, 2016, Düsseldorf, 3 pages.

Alvaro Retana, et al., "Link-State Protocols in Data Center Networks", The Internet Protocol Journal, vol. 16, No. 2, Cisco, https://www.cisco.com/c/en/us/about/press/internet-protocol-journal/back-issues/table-contents-60/162-Isp.html, last accessed Mar. 1, 2018, 3 pages.

H. Gredler, et al., "North-Bound Distribution of Link-State and Traffic Engineering (TE) Information Using BGP", Internet Engineering Task Force (IETF), ISSN: 2070-1721, RFC 7752, Mar. 2016, 48 pages.

S. Previdi, et al., "BGP Link-State extensions for Segment Routing", draft-ietf-idr-bgp-ls-segment-routing-ext-04, Inter-Domain Routing, Internet-Draft, Jan. 2018, 27 pages.

Dell, "Active Fabric Manager 2.7", Dell Inc., Version 1.2, Nov. 2015, 4 pages.

Arista Networks, "CloudVision® Demo", Oct. 2, 2015, https://www.youtube.com/watch?v=_gS5IrTBXW8.

\* cited by examiner

| # | NETWORK NODE | SUBNETWORK | | |
|---|---|---|---|---|
| 1 | DC-NY-1 | 20.20.20.0/24 | ✏️ | 🗑️ |
| 2 | DC-NY-2 | 10.10.20.0/24 | ✏️ | 🗑️ |
| 3 | DC-NY-3 | 53.6.6.6/32 | ✏️ | 🗑️ |
| 4 | DC-NY-3 | 10.10.10.0/24 | ✏️ | 🗑️ |

[New] [Refresh]

NETWORK FABRIC VISUALIZATION AND MANAGEMENT

TECHNICAL FIELD

The present disclosure generally relates to management and control of network fabrics.

BACKGROUND

As demand increases for greater connectivity and data storage, management and control of network fabrics is becoming more essential. One important aspect of network management is an ability to reflect an up-to-date status of large scale network topology.

Border Gateway Protocol (BGP) Link-State (LS) is an Address Family Identifier (AFI) and Sub-address Family Identifier (SAFI) defined to carry Interior Gateway Protocol (IGP) link-state database through BGP. BGP-LS delivers network topology information to topology servers and Application Layer Traffic Optimization (ALTO) servers. BGP-LS allows policy-based control of aggregation, information-hiding, and abstraction.

Segment Routing is a method of forwarding packets through a network based on the source routing paradigm. The forward path is determined prior to sending a packet. The path is encoded in the packet at the source, as a list of segments bearing forwarding instructions. At each hop, the top segment, which references the router information base (RIB), is used to identify the next hop. Segments are stacked in order, at the top of the packet header. When the top segment contains the identity of another node, the receiving node uses Equal-Cost Multi-Path routing (ECMP) to move the packet to the next hop.

DESCRIPTION OF EXAMPLE EMBODIMENTS

Overview

In one example embodiment, a server, using Border Gateway Protocol Link-State, obtains, from a particular network node of a plurality of network nodes in a network fabric configured for segment routing, network topology information of the plurality of network nodes including segment identifiers of the plurality of network nodes. The particular network node gathered the network topology information from other network nodes of the plurality of network nodes using an underlay routing protocol. Based on the network topology information, the server generates a visualization of a topology of the network fabric including the plurality of network nodes and a plurality of links connecting the plurality of network nodes.

In a further example embodiment, the server obtains an ordered selection of the plurality of network nodes. The server modifies the visualization of the topology of the network fabric to display the ordered selection of the plurality of network nodes as a segment routing path to route network traffic from a first network node in the ordered selection to a last network node in the ordered selection, and to display the segment identifiers of a second network node in the ordered selection through the last network node.

In another further example embodiment, the server obtains respective service attributes corresponding to respective ones of the plurality of network nodes. The respective service attributes represent respective types of services provided by the respective ones of the plurality of network nodes. The server generates indications of the respective types of services, obtains an ordered selection of the respective types of services, and modifies the visualization to display the respective types of services as a service chain.

EXAMPLE EMBODIMENTS

Figure 1:
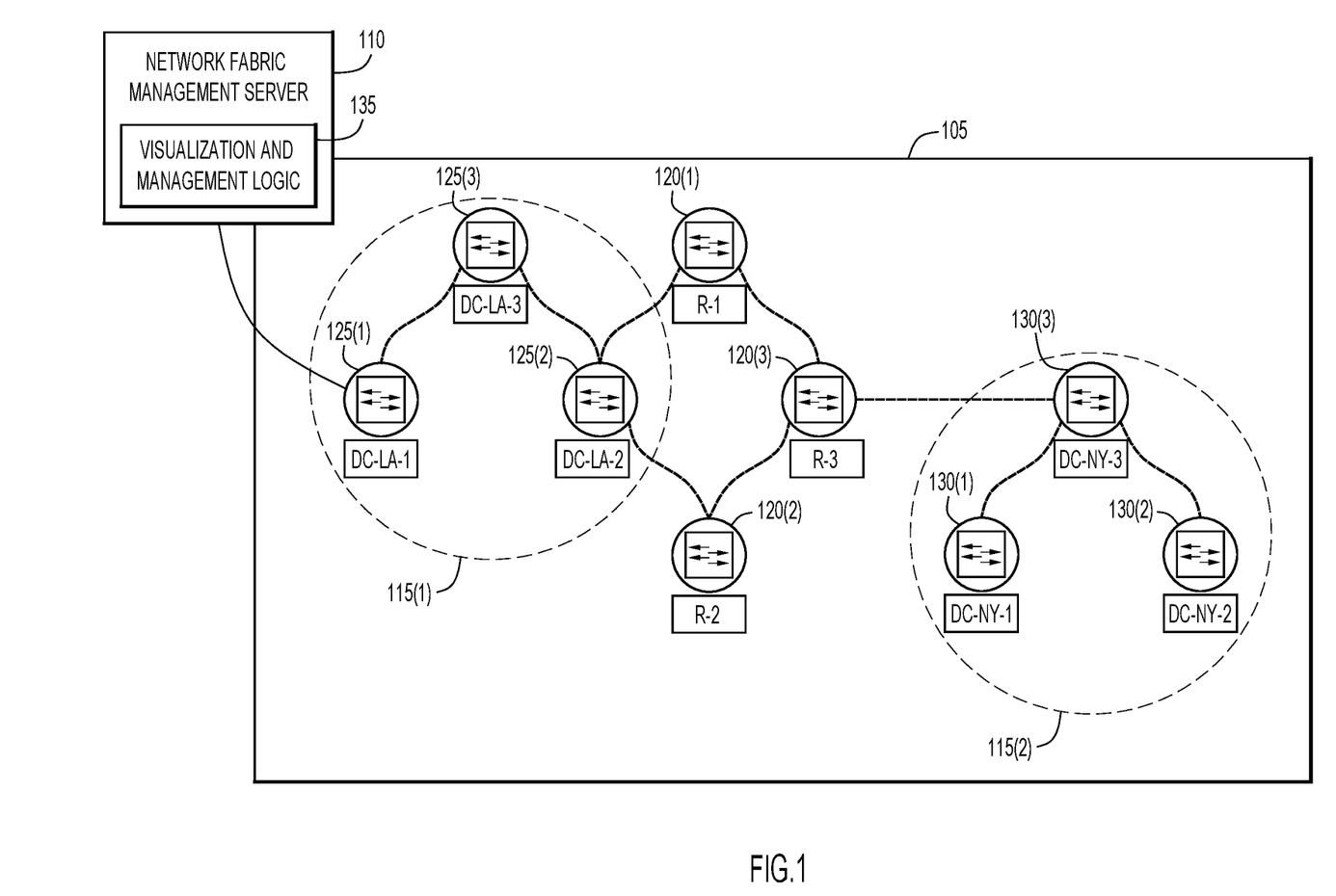
FIG. 1 is a simplified block diagram of a system including a network fabric in communication with a network fabric management server configured for network fabric visualization and management, according to an example embodiment.

With reference made to FIG. 1, shown is a system including a network fabric 105 and a network fabric management server 110. Network fabric 105 includes data centers 115(1) and 115(2) and intermediate network nodes 120(1)-120(3). Data center 115(1) includes network nodes 125(1)-125(3), and data center 115(2) includes network nodes 130(1)-130(3). Network fabric 105 is configured for segment routing.

Network nodes 120(1)-120(3), 125(1)-125(3), and 130(1)-130(3) may be switches, routers, etc. In one example, intermediate network nodes 120(1)-120(3) are routers, and as such may be referred to herein as network nodes R-1, R-2, and R-3, respectively. Data center 115(1) serves a location in Los Angeles, and as such network nodes 125(1)-125(3) may be referred to herein as network nodes DC-LA-1, DC-LA-2, and DC-LA-3, respectively. Data center 115(2) serves a location in New York, and as such network nodes 130(1)-130(3) may be referred to herein as network nodes DC-NY-1, DC-NY-2, and DC-NY-3, respectively.

Network fabric management server 110 may be a Data Center Network Manager (DCNM) for data centers 115(1) and 115(2). Network fabric management server 110 may be one of a plurality of computing devices in a network fabric management station. It will be appreciated that visualization and management logic 135 may be implemented on a single computing device (e.g., network fabric management server 110) at the network fabric management station, or distributed across several computing devices at the network fabric management station.

A traditional DCNM is a network management system that offers integrated visualization, provisioning, and troubleshooting of a network (e.g., Local Area Network (LAN)) fabric topology. At present, a DCNM typically gathers network fabric topology information by running Cisco Discovery Protocol (CDP) or Link Layer Discovery Protocol (LLDP) on every network node of the network fabric and periodically polling the network nodes for the CDP or LLDP data. While neighbor information provided by CDP or LLDP enables a DCNM to map the fabric topology, several limitations are inherent in such a method. For example, the DCNM may need access to every network node of the entire network fabric to obtain the CDP or LLDP data. This may not be possible in the case of a multi-fabric environment where different network fabrics are controlled by separate DCNMs. Furthermore, access credentials are not always available to access other network fabrics.

Additionally, for each new poll, it is usually the case that complete network fabric topology information is fetched regardless of whether any change occurred since the previous poll. This polling prompts the exchange of unnecessary information which costs both bandwidth and processing resources. Furthermore, frequently accessing every switch in the network fabric poses a scaling challenge as the size of the network fabric increases. To further complicate this, a network fabric topology change is only updated at the DCNM once every polling period. In some cases, in order to avoid flooding the network with excess noise, a minimum of five minutes is enforced as a polling interval.

Another drawback of CDP and LLDP is that they provide link layer level information. As Internet Protocol (IP) network fabrics become more popular, it is increasingly important to have information available from DCNMs on Layer 3 (L3) connectivity. Data centers are moving to completely L3 based connectivity and some customers are reluctant to add Layer 2 (L2) protocols such as CDP LLDP merely for discovery purposes. Moreover, defining an explicit path in current segment routing traffic engineering can only be accomplished by a Command Line Interface (CLI), which is cumbersome and error-prone.

Accordingly, provided herein is an L3-based discovery mechanism that is scalable and redundant. Briefly, this mechanism leverages topology information obtained via Border Gateway Protocol Link State (BGP-LS) and simplifies explicit path traffic engineering and service chain policy using the obtained topology information. The present mechanisms address the limitations of conventional DCNMs by integrating BGP-LS with a DCNM for topology visualization and Segment Routing traffic engineering. As described herein, network fabric management server 110 may run BGP-LS protocol and peer with data center fabric network(s) for network topology visualization, define segment routing traffic engineering policies for the fabric based on data obtained from BGP-LS, and/or use a BGP-LS service attribute which carries service type information to create a service chaining policy.

As specified in North-Bound Distribution of Link-State and Traffic Engineering (TE) Information Using BGP, Internet Engineering Task Force (IETF) Request for Comments (RFC) 7752, an Address Family Identifier (AFI) and Sub-Address Family Identifier (SAFI) are defined to carry LS information via BGP. Each LS object, namely a network node, link, or prefix, is encoded in the BGP Network Layer Reachability Information (NLRI) encoding format and the properties of the object are encoded in the BGP-LS attribute. LS and TE information from within a network which is shared inside the network via Interior Gateway Protocols (IGPs), such as Intermediate System to Intermediate System (IS-IS) and Open Shortest Path First (OSPF), can be collected and shared with external network components using BGP.

In embodiments described herein, network fabric management server 110 is configured to run Border Gateway Protocol (BGP), and as such may function as a BGP speaker. If network fabric management server 110 is one of a plurality of computing devices in a network fabric management station, there may be multiple BGP speakers, for instance, in order to provide redundancy. A BGP speaker may be implemented in a container on one application hosted by the network fabric management server 110.

Network fabric management server 110 may establish a BGP session with a second BGP speaker of one of network nodes 120(1)-120(3), 125(1)-125(3), and 130(1)-130(3). By way of example, network fabric management server 110 is in a BGP session with the second BGP speaker, in this example, in network node 125(1). For redundancy, a third BGP speaker on the fabric (e.g., in network node 125(3)), may also have a BGP session with the network fabric management server 110.

Network fabric 105 is configured to run one or more underlay routing protocols (e.g., IS-IS, OSPF, BGP, etc.) to distribute topology information internally. For example, network node 125(1) may use the underlay routing protocol(s) to gather topology information of the other network nodes in the network fabric 105. Regardless of the specific underlay routing protocol, network node 125(1) may run BGP-LS to redistribute LS information gathered via the underlay routing protocol to the network fabric management server 110. Using BGP-LS, the network fabric management server 110 obtains, from network node 125(1), network topology information of network nodes 120(1)-120(3), 125(1)-125(3), and 130(1)-130(3). The network topology information includes segment identifiers of network nodes 120(1)-120(3), 125(1)-125(3), and 130(1)-130(3).

This approach addresses the aforementioned limitations on the existing CDP/LLDP approaches because the network fabric management server 110 only needs to peer with only one network node (e.g., network node 125(1)). This peering requires only IP connectivity. In addition, once the network fabric management server 110 receives the initial topological state of network fabric 105, network node 125(1) need only provide subsequent updates in the form of incremental changes (rather than providing redundant topological information). Thus, when the network fabric 105 is in a stable state, only lightweight BGP keep-alive messages will consume the network bandwidth and processing resources. As a result, BGP-LS provides a more scalable solution.

Moreover, BGP updates provide updates to the topology of network fabric 105 more quickly than the conventional polling model used for CDP. Furthermore, BGP-LS provides not only link layer level information, but also information relating to the L3 connectivity of the underlay network (e.g., link IP address, link bandwidth, IGP metric, etc.). This provides a snapshot of the health of L3 connectivity. In addition, using BGP-LS enables the network fabric management server 110 to determine a multi-fabric topology that includes multiple products, even those produced by different vendors. This is because the network fabric management server 110 no longer needs to directly access each network node to determine the topological layout of the network fabric 105.

The network fabric management station 110 may store the topology information obtained from network node 125(1), update its local database accordingly, and then graphically display the topology of the multi-fabric network topology 120 on the basis of the stored information and updates. That is, based on the network topology information, network fabric management station 110 may generate a visualization (e.g., a Graphical User Interface (GUI)) of a topology of the network fabric 105 including network nodes 120(1)-120(3), 125(1)-125(3), and 130(1)-130(3) and a plurality of links connecting network nodes 120(1)-120(3), 125(1)-125(3), and 130(1)-130(3).

Figure 2:
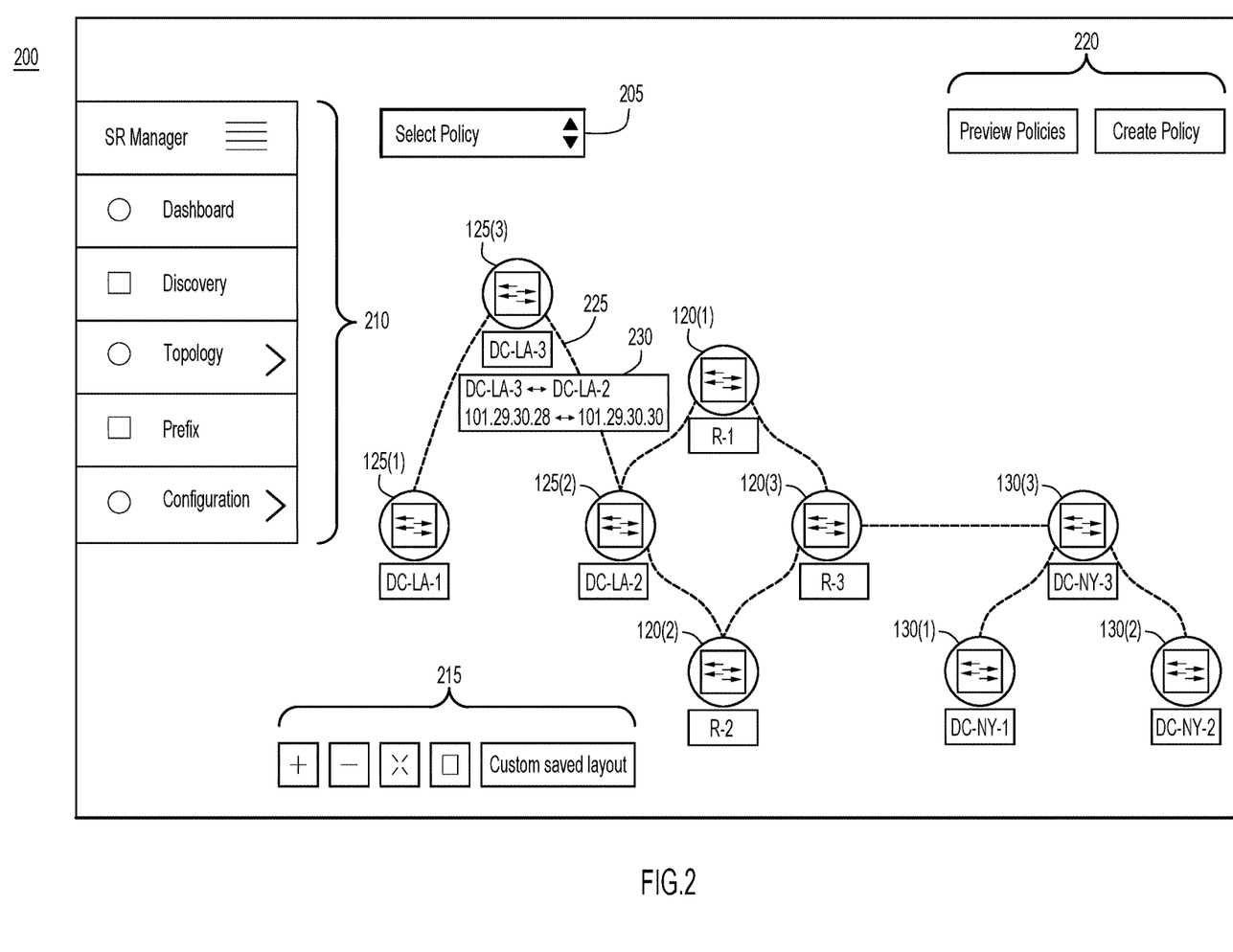
FIG. 2 illustrates a visualization illustrating a topology of the network fabric, according to an example embodiment.

Reference is now additionally made to FIG. 2, which shows an example illustration of a visualization 200 for displaying network fabric 105. The visualization 200 may be displayed by network fabric management server 110. The visualization 200 includes a policy dropdown 205, navigation menu 210, display options 215, and policy buttons 220. The visualization 200 also shows links between network nodes 120(1)-120(3), 125(1)-125(3), and 130(1)-130(3).

For example, link 225 is between network nodes 125(2) and 125(3). When the link 225 is selected (e.g., clicked, hovered over, etc.), network fabric management server 110 obtains this selection and, in response, displays overlay 230. Overlay 230 includes network names and addresses of network nodes 125(2) and 125(3). In this example, overlay 230 shows network names DC-LA-3 and DC-LA-2, and IP addresses 101.29.30.28 and 101.29.30.30 (here, network node 125(2) has a network name of DC-LA-2 and an IP address of 101.29.30.30, and network node 125(3) has a network name of DC-LA-3 and an IP address of 101.29.30.28). Other information may also be provided as appropriate in the overlay 230. The overlay 230 may include IP prefixes associated with network nodes 125(2) and 125(3).

Segment Routing (SR) provides a source routing architecture whereby a source or network entry point can specify a forwarding path and encode the path as an ordered list of segments carried in a network packet. A Segment Routing policy to steer network traffic differently from normal/default routing may be used for traffic engineering, multi-plane segmentation, service chaining, etc.

BGP Link-State extensions for Segment Routing, IETF Draft-ietf-idr-bgp-ls-segment-routing-ext-04 defines Segment Routing extensions to BGP-LS and specifies type-length-values (TLVs) and sub-TLVs for advertising Segment Routing information. The TLVs include Segment Identifier (SID)/Label Sub-TLVs for nodes, and Adjacency SID (ADJ-SID) Sub-TLVs representing a link of a node.

In a further example, visualization 200 may enable a user to configure network fabric 105. In one embodiment, the network fabric management server 110 may be used to create/define a traffic engineering policy. Briefly, upon receiving BGP-LS updates, network fabric management server 110 updates its local database to include network nodes, links, and prefixes, SID and ADJ-SID information. Visualization 200 displays the network topology built from BGP-LS updates received from network node 125(1). A user of the visualization 200 is then able to define a Segment Routing traffic engineering policy by clicking nodes and links in an order that the traffic is to traverse. In accordance with Segment Routing techniques, the network node sending a packet may partially or completely specify the route the packet takes through the network. If Multiprotocol Label Switching (MPLS) is implemented, the SID and ADJ-SID are in the format of MPLS labels.

In one example, a user wishes to define a Segment Routing traffic engineering policy for a Segment Routing path from network node 125(1) to network node 130(3). The default Segment Routing path, to route packets from network node 125(1) to network node 130(3) includes, in order, network node 125(1), network node 125(3), network node 125(2), network node 120(2), network node 120(3), and network node 130(3). However, for reasons of traffic engineering, it may be preferable to route the packets via network node 125(1), network node 125(3), network node 125(2), network node 120(1), network node 120(3), and network node 130(3) (i.e., routing through network node 120(1) instead of network node 120(2). In this case, the network fabric management server 110 may obtain an ordered selection of the network nodes comprising the preferred Segment Routing path (i.e., network node 125(1), network node 125(3), network node 125(2), network node 120(1), network node 120(3), network node 130(3)). The network fabric management server 110 may obtain an ordered selection, for example, from a user clicking respective network nodes along the preferred Segment Routing path. It will be appreciated that a user may also specify links in a Segment Routing path in addition to network nodes. For example, if link 225 is one of multiple links connecting network nodes 125(3) and 125(2), a user may specify link 225 by selecting (e.g., clicking) on the link in visualization 200.

Figure 3:
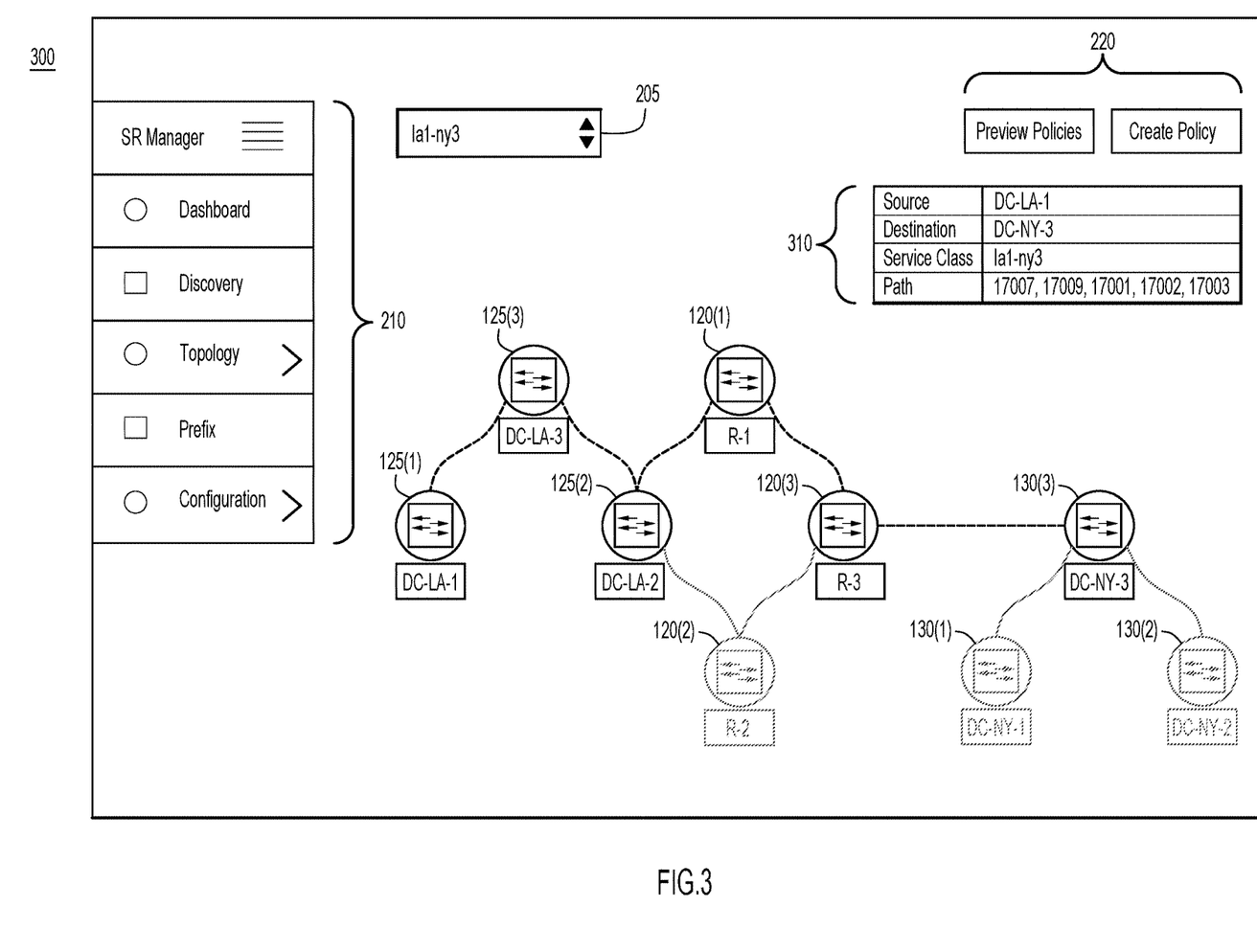
FIG. 3 illustrates a modified visualization displaying a network path in the network fabric, according to an example embodiment.

FIG. 3 illustrates a modified visualization 300 displaying the preferred Segment Routing path. The modified visualization 300 may be a modification of visualization 200. More specifically, modified visualization 300 includes similar features as visualization 200, but now includes a table 310. The modified visualization 300 also displays the preferred Segment Routing path by greying out network nodes 120(2), 130(1), and 130(2) and their corresponding links. The first network node in the preferred Segment Routing path is network node 125(1), and the last network node in the preferred Segment Routing path is network node 130(3). As shown, the preferred path is referred to as "la1-ny3".

The modified visualization 300 further displays the SIDs of network nodes 125(3), 125(2), 120(1), 120(3), 130(3). The network fabric management server 110 translates the network nodes 125(3), 125(2), 120(1), 120(3), 130(3) to node SIDs to compose a path list shown in table 310. In the case of MPLS, the path list is in the form of label stacks, based on the SID labels, where labels represent network nodes. In the example of FIG. 3, SID 17007 corresponds to network node 125(3), SID 17009 corresponds to network node 125(2), SID 17001 corresponds to network node 120(1), SID 17002 corresponds to network node 120(3), and SID 17003 corresponds to network node 130(3). Table 310 also shows the source as DC-LA-1 (i.e., network node 125(1)), the destination as DC-NY-3 (i.e., network node 130(3)), and the service class as Segment Routing path la1-ny3. If the user also specifies links in the preferred Segment Routing path, modified visualization 300 would further display corresponding ADJ-SIDs in the path shown in table 310.

Figure 4:
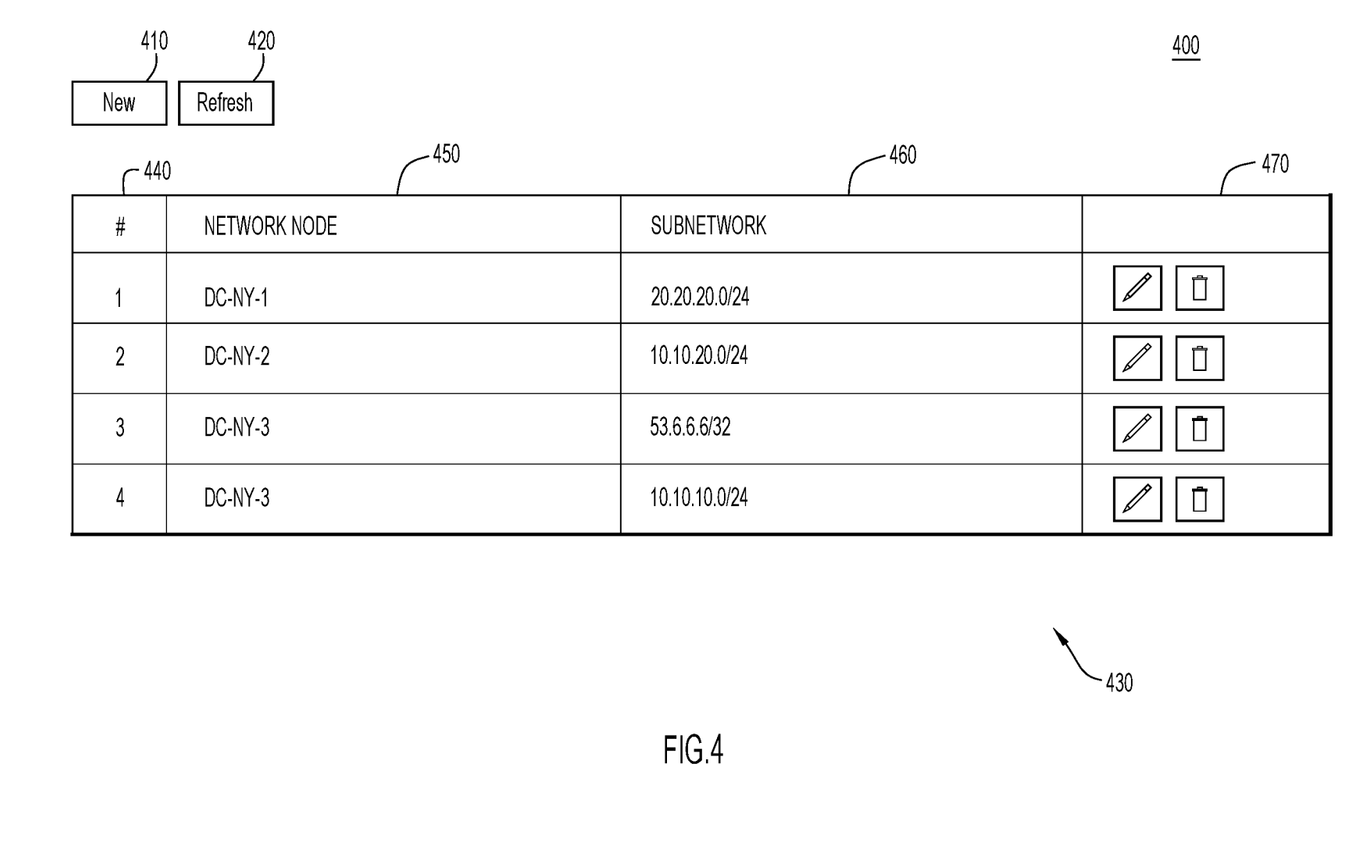
FIG. 4 illustrates a Graphical User Interface (GUI) for a user to associate a network node in the network fabric with a subnetwork, according to an example embodiment.

FIG. 4 illustrates a GUI 400 which allows a user to associate respective network nodes in the network fabric 105 with respective subnetworks with which the respective network nodes are operable to communicate. GUI 400 includes "New" button 410, "Refresh" button 420, and table 430. Table 430 includes item number column 440, network node column 450, subnetwork column 460, and edit/delete options 470. It will be appreciated that subnetwork column 460 displays prefixes corresponding to respective subnetworks.

In this example, table 430 associates DC-NY-1 (i.e., network node 130(1)) with subnetwork 20.20.20.0/24, DC-NY-2 (i.e., network node 130(2)) with subnetwork 10.10.20.0/24, and DC-NY-3 (i.e., network node 130(3)) with subnetworks 53.6.6.6/32 and 10.10.10.0/24. Table 430 may be updated manually or automatically. "New" button 410 allows a user to manually add an external prefix to table 430, and "Refresh" button 420 causes network fabric management server 110 to automatically update table 430 with prefixes advertised via BGP-LS. Edit/delete options 470 allow a user to manually edit or delete entries in the table 430.

Figure 5:
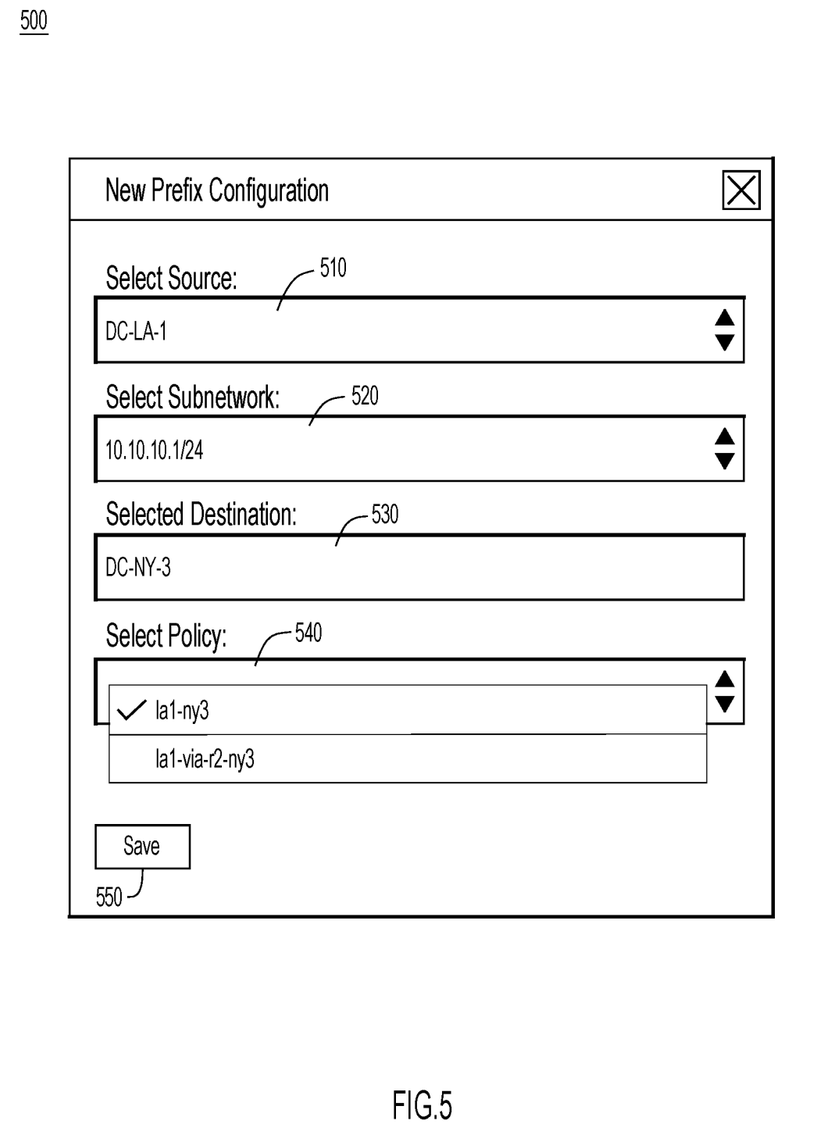
FIG. 5 illustrates a GUI for a user to select a network path to apply to the network fabric, according to an example embodiment.

FIG. 5 illustrates a GUI 500 which allows a user to select a Segment Routing path to apply to the network fabric 105. GUI 500 includes source dropdown 510, subnetwork dropdown 520, selected destination display 530, policy dropdown 540, and save button 550. In one example, network fabric management server 110 may determine that network node 125(1) is a source network node (e.g., based on a user selection from source dropdown 510) and subnetwork 10.10.10.1/24 is a destination subnetwork (e.g., based on a user selection from subnetwork dropdown 520). When subnetwork 10.10.10.1/24 is selected, for example, the network fabric management server 110 may provide an indication in selected destination display 530 that network node 130(3) is the destination node. The network fabric management server 110 may provide this indication because of manual (e.g., via GUI 400) or automatic (e.g., via BGP-LS) updates associating network node 130(3) with the selected subnetwork 10.10.10.1/24.

In response to determining that network node 125(1) is a source network node and subnetwork 10.10.10.1/24 is a destination subnetwork, the network fabric management server 110 may identify Segment Routing path la1-ny3 as a candidate Segment Routing path for instantiation in network node 125(1). This is shown in policy dropdown 540. Also shown is the default path la1-via-r2-ny3, which includes routing through network node 120(2) instead of network node 120(1). In this example, since Segment Routing path la1-ny3 (i.e., using network node 120(1)) is preferable, the user may select path la1-ny3 from the policy dropdown 540. The user may save the policy by selecting (e.g., clicking) the save button 550.

Figure 6:
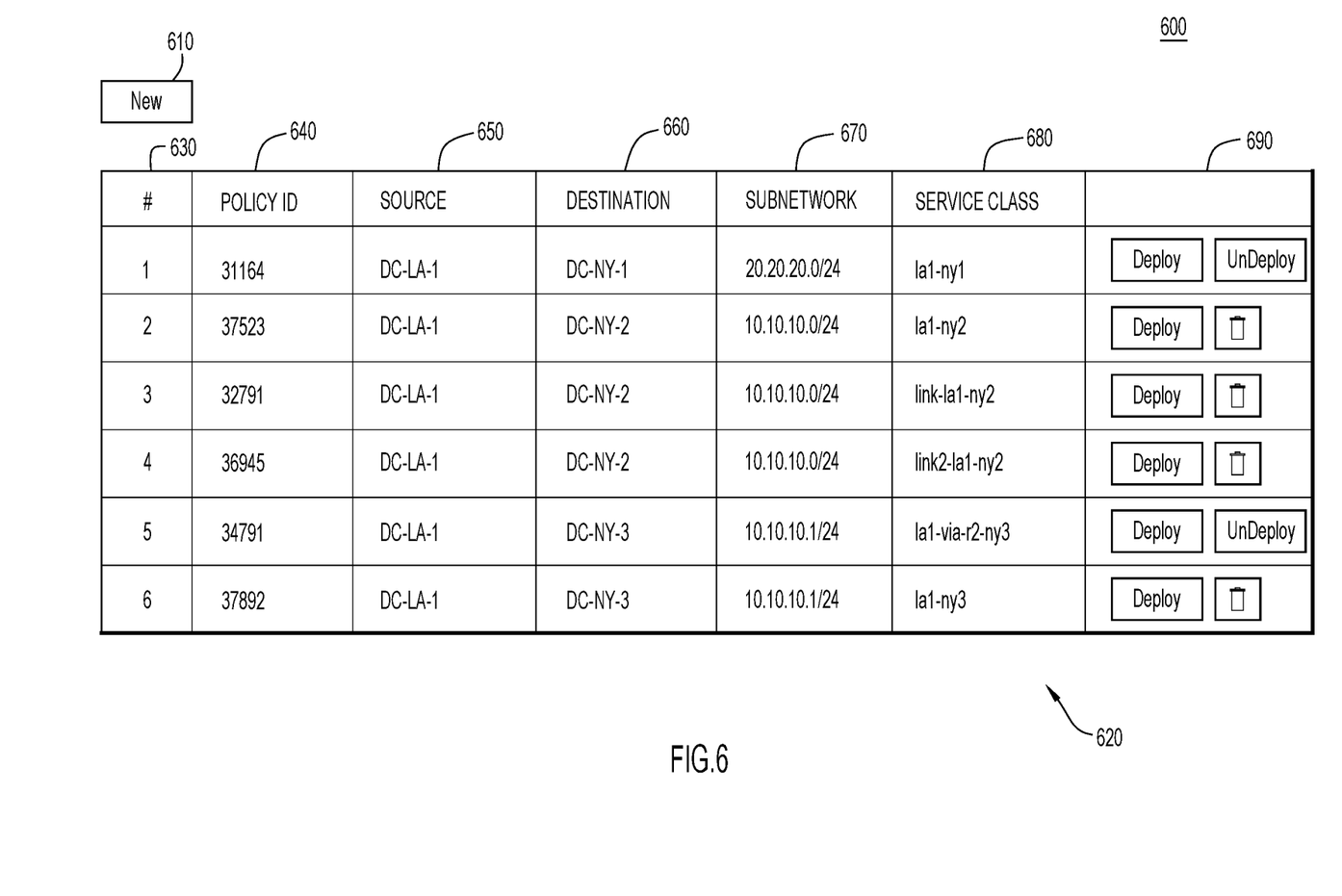
FIG. 6 illustrates a table that presents a list of network paths, according to an example embodiment.

FIG. 6 illustrates a GUI 600 including a "New" button 610 and table 620. Table 620 presents a list of network paths, and includes an item number column 630, policy ID column 640, source column 650, destination column 660, subnetwork column 670, service class column 680, and deploy/undeploy column 690. "New" button 610, when selected, enables a user to add a new Segment Routing path to the table 620. Policy ID column 640 displays an identifier of each available policy. The source column 650 identifies the source network node. The destination column 660 identifies the destination network node. The subnetwork column 670 identifies a prefix (i.e., subnet) to which a policy is applied. The service class column 680 identifies a particular service, (i.e., Segment Routing path) applied to the packets at the source network node.

By way of example, in policy ID 37892, packets entering source node 125(1) with the destination IP having the prefix 10.10.10.1/24 are routed to destination node 130(3) via service class (Segment Routing path) la1-ny3. Policy ID 34791 corresponds to the default Segment Routing path. The user may undeploy the (currently instantiated) default Segment Routing path by selecting (e.g., clicking) the "undeploy" button for policy ID 34791. This may cause the network fabric management server 110 to remove the default Segment Routing path from network node 125(1).

The user may further select (e.g., click) the deploy button for policy ID 37892. This causes network fabric management server 110 to instantiate (e.g., deploy) the preferred Segment Routing path la1-ny3 in network node 125(1) by providing (e.g., sending/pushing) the SIDs for network nodes 125(3), 125(2), 120(1), 120(3), and 130(3) (i.e., SIDs 17007, 17009, 17001, 17002, and 17003). The Segment Routing path (here, la1-ny3) is instantiated at the source network node (here, network node 125(1)) because of the source routing nature of Segment Routing, whereby the Segment Routing path is applied at the source network node.

It will be appreciated that the above discussion focuses on MPLS by way of example. In systems where IP version 6 (IPv6) is implemented, then corresponding mechanisms may be implemented using appropriate techniques.

Similar mechanisms may be used at the network fabric management server 110 to define a policy for Egress Peer Engineer (EPE). EPE enables an ingress network node to steer network traffic towards a specific egress network node and a specific external interface to reach external destinations. In this example, after receiving SIDs and ADJ-SIDs via BGP-LS, the network fabric management server 110 allows the user to define an EPE policy by selecting an egress router and a link to the egress router. A policy may then be associated with external routes. The network fabric management server 110 composes the policy using the associated SID and ADJ-SID and pushes the configuration to the selected ingress node.

A path may be used not only for the purposes of traffic engineering and multi-plane segmentation, but also/alternatively to facilitate the creation of a policy for service chaining. Turning back to FIG. 1, network node 125(1) may initially gather respective service attributes from network nodes 120(1)-120(3), 125(2), 125(3), and 130(1)-130(3) using the underlay routing protocol(s) of network fabric 105. The respective service attributes represent respective types of services provided by network nodes 120(1)-120(3), 125(2), 125(3), and 130(1)-130(3).

The service attributes may be defined as a Type-Length-Value (TLV) in IS-IS and/or OSPF, and carried in IGP LS updates. The corresponding service may be provided by a network node in the network fabric 105, or by an external device (physical or virtual) adjacent to the network node. In the latter case, the network node may act as a proxy to announce the service presence on behalf of the external device.

Once network node 125(1), or any other network node running BGP LS, has gathered the service attributes, network fabric management server 110 may obtain (with the network topology information) the service attributes from network node 125(1). Here, the service attribute may be a LS prefix attribute TLV in BGP-LS. The service attribute may be an optional attribute associated with a Network Layer Reachability Information (NLRI) prefix, which includes a length and a prefix. If the service attribute is present, it defines a type of service the prefix represents (e.g., firewall, load balancer, etc.). The prefix may be a physical IP address, or a virtual IP address shared by multiple service instances of the same service type. The service attribute may be carried in BGP-LS updates along with the prefix and SID corresponding to the prefix.

The network fabric management server 110 may then generate a visualization of the topology of network fabric 105. The visualization may be similar to visualization 200 (FIG. 2), but may also include indications of the services provided by network nodes 120(1)-120(3), 125(1)-125(3), and 130(1)-130(3). For a service provided by multiple instances and represented by a virtual IP address and anycast SID, the network fabric management server 110 may aggregate the service in the form of a virtual service instance.

The user may select (e.g., click) the services (physical or virtual) in the order in which the user wishes the traffic to traverse. The user may also optionally select (e.g., click) non-service network nodes and links. The network fabric management server 110 may thus obtain an ordered selection of the respective types of services provided by network nodes 120(1)-120(3), 125(1)-125(3), and 130(1)-130(3). The network fabric management server 110 may then modify the visualization to display the respective types of services as a service chain, and to display the SIDs of network nodes 120(1)-120(3), 125(2), 125(3), and 130(1)-130(3).

The network fabric management server 110 may further associate the service chain with a source subnetwork, a destination subnetwork, or an incoming interface. The network fabric management server 110 may compose the policy configuration by translating network nodes, links, and/or services to the corresponding SID and push the configuration to an ingress node. For instance, the network fabric management server 110 may instantiate the service chain in the network node 125(1). In one example, the network fabric management server 110 associates and/or instantiates the service chain in response to information/directions/selections input by a user.

Figure 7:
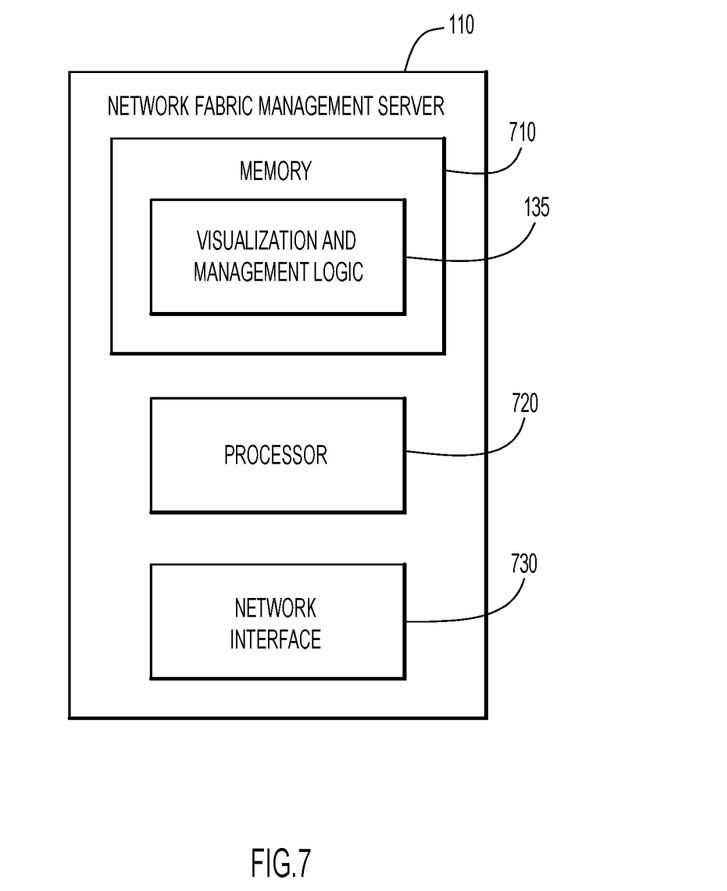
FIG. 7 is a block diagram of a network fabric management server configured to execute network fabric visualization and/or management techniques, according to an example embodiment.

FIG. 7 is a simplified block diagram of network fabric management server 110. In this example, the network fabric management server 110 includes a memory 710 that stores instructions for visualization and management logic 135, one or more processors 720, and a network interface 730. The one or more processors 720 are configured to execute instructions stored in the memory 710 for the visualization and management logic 135. When executed by the one or more processors 720, the visualization and management logic 135 causes the network fabric management server 110 to perform operations described herein.

The memory 710 may be read only memory (ROM), random access memory (RAM), magnetic disk storage media devices, optical storage media devices, flash memory devices, electrical, optical, or other physical/tangible memory storage devices. Thus, in general, the memory 710 may be one or more tangible (non-transitory) computer readable storage media (e.g., a memory device) encoded with software comprising computer executable instructions and when the software is executed (by the processor 720) it is operable to perform the operations described herein.

The network interface 730 is a network interface card (or multiple instances of such a device) or other network interface device that enables network communications on behalf of the network fabric management server 110 for sending and receiving messages (e.g., BGP-LS updates, instantiations of Segment Routing paths and/or service chains, etc.) as described above. The network fabric management server 110 may also be configured to interact with a user via user equipment (e.g., screen for displaying visualizations, computer mouse for receiving user selections, keyboard for receiving user input, etc.)

Figure 8:
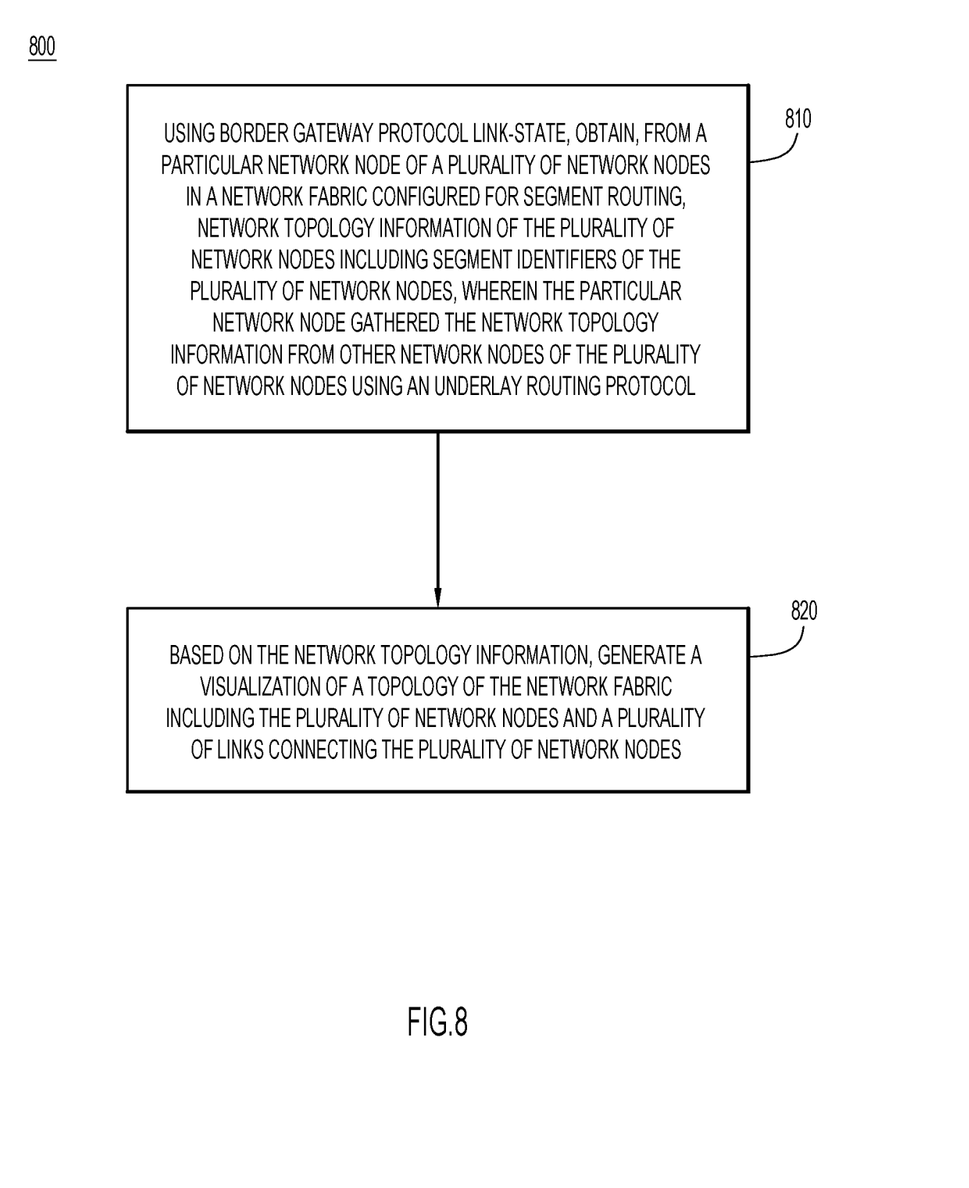
FIG. 8 is a flowchart of a method for network fabric visualization and/or management, according to an example embodiment.

FIG. 8 is a flowchart of an example method 800 for network fabric visualization and/or management. A server (e.g., network fabric management server 110) may perform method 800. At 810, the server, using BGP-LS, obtains, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol. At 820, based on the network topology information, the server generates a visualization of a topology of the network fabric including the plurality of network nodes and a plurality of links connecting the plurality of network nodes.

In one form, a method is provided. The method comprises: using Border Gateway Protocol Link-State, obtaining, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol; and based on the network topology information, generating a visualization of a topology of the network fabric including the plurality of network nodes and a plurality of links connecting the plurality of network nodes.

In another form, an apparatus is provided. The apparatus comprises: a network interface configured to provide and/or obtain network communications; and one or more processors coupled to the network interface, wherein the one or more processors are configured to: using Border Gateway Protocol Link-State, obtain, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol; and based on the network topology information, generate a visualization of a topology of the network fabric including the plurality of network nodes and a plurality of links connecting the plurality of network nodes.

In another form, one or more non-transitory computer readable storage media are provided. The non-transitory computer readable storage media are encoded with instructions that, when executed by a processor, cause the processor to: using Border Gateway Protocol Link-State, obtain, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol; and based on the network topology information, generate a visualization of a topology of the network fabric including the plurality of network nodes and a plurality of links connecting the plurality of network nodes.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   using Border Gateway Protocol Link-State, obtaining, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol;
based on the network topology information, generating a visualization of a topology of the network fabric including the plurality of network nodes and a plurality of links connecting the plurality of network nodes;
obtaining an ordered selection of the plurality of network nodes; and
modifying the visualization of the topology of the network fabric to display the ordered selection of the plurality of network nodes as a segment routing path to route network traffic from a first network node in the ordered selection to a last network node in the ordered selection, and to display the segment identifiers of a second network node in the ordered selection through the last network node.

2. The method of claim 1, further comprising:
associating the last network node with a subnetwork with which the last network node is operable to communicate;
determining that the first network node is a source network node and the subnetwork is a destination subnetwork;
in response to determining that the first network node is the source network node and the subnetwork is the destination subnetwork, identifying the segment routing path as a candidate segment routing path for instantiation in the first network node; and
instantiating the segment routing path in the first network node by providing the first network node with the segment identifiers of the second network node through the last network node.

3. The method of claim 1, further comprising:
obtaining a selection of a particular link of the plurality of links, wherein the particular link connects two network nodes of the plurality of network nodes; and
in response to the selection, displaying an overlay including network names and addresses of the two network nodes.

4. An apparatus comprising:
a network interface configured to provide and/or obtain network communications; and
one or more processors coupled to the network interface, wherein the one or more processors are configured to:
using Border Gateway Protocol Link-State, obtain, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol;
based on the network topology information, generate a visualization of a topology of the network fabric including the plurality of network nodes and a plurality of links connecting the plurality of network nodes;
obtain an ordered selection of the plurality of network nodes; and
modify the visualization of the topology of the network fabric to display the ordered selection of the plurality of network nodes as a segment routing path to route network traffic from a first network node in the ordered selection to a last network node in the ordered selection, and to display the segment identifiers of a second network node in the ordered selection through the last network node.

5. The apparatus of claim 4, wherein the one or more processors are further configured to:
associate the last network node with a subnetwork with which the last network node is operable to communicate;
determine that the first network node is a source network node and the subnetwork is a destination subnetwork;
in response to determining that the first network node is the source network node and the subnetwork is the destination subnetwork, identify the segment routing path as a candidate segment routing path for instantiation in the first network node; and
instantiate the segment routing path in the first network node by providing the first network node with the segment identifiers of the second network node through the last network node.

6. The apparatus of claim 4, wherein the one or more processors are further configured to:
obtain respective service attributes corresponding to respective ones of the plurality of network nodes, wherein the respective service attributes represent respective types of services provided by the respective ones of the plurality of network nodes;
generate indications of the respective types of services;
obtain an ordered selection of the respective types of services; and
modify the visualization of the topology of the network fabric to display the respective types of services as a service chain.

7. The apparatus of claim 6, wherein the one or more processors are further configured to:
associate the service chain with an incoming interface, a source subnetwork, or a destination subnetwork; and
instantiate the service chain in a first network node of the service chain.

8. The apparatus of claim 6, wherein the particular network node gathered the respective service attributes from the other network nodes of the plurality of network nodes using the underlay routing protocol.

9. The apparatus of claim 4, wherein the one or more processors are further configured to:
obtain a selection of a particular link of the plurality of links, wherein the particular link connects two network nodes of the plurality of network nodes; and
in response to the selection, display an overlay including network names and addresses of the two network nodes.

10. One or more non-transitory computer readable storage media encoded with instructions that, when executed by a processor, cause the processor to:
using Border Gateway Protocol Link-State, obtain, from a particular network node of a plurality of network nodes in a network fabric configured for segment routing, network topology information of the plurality of network nodes including segment identifiers of the plurality of network nodes, wherein the particular network node gathered the network topology information from other network nodes of the plurality of network nodes using an underlay routing protocol;
based on the network topology information, generate a visualization of a topology of the network fabric including the plurality of network nodes and a plurality of links connecting the plurality of network nodes;

obtain an ordered selection of the plurality of network nodes; and modify the visualization of the topology of the network fabric to display the ordered selection of the plurality of network nodes as a segment routing path to route network traffic from a first network node in the ordered selection to a last network node in the ordered selection, and to display the segment identifiers of a second network node in the ordered selection through the last network node.

11. The one or more non-transitory computer readable storage media of claim 10, wherein the instructions further cause the processor to:

associate the last network node with a subnetwork with which the last network node is operable to communicate;

determine that the first network node is a source network node and the subnetwork is a destination subnetwork;

in response to determining that the first network node is the source network node and the subnetwork is the destination subnetwork, identify the segment routing path as a candidate segment routing path for instantiation in the first network node; and instantiate the segment routing path in the first network node by providing the first network node with the segment identifiers of the second network node through the last network node.

12. The one or more non-transitory computer readable storage media of claim 10, wherein the instructions further cause the processor to:

obtain respective service attributes corresponding to respective ones of the plurality of network nodes, wherein the respective service attributes represent respective types of services provided by the respective ones of the plurality of network nodes;

generate the visualization including indications of the respective types of services;

obtain an ordered selection of the respective types of services; and modify the visualization of the topology of the network fabric to display the respective types of services as a service chain.

13. The one or more non-transitory computer readable storage media of claim 12, wherein the instructions further cause the processor to:

associate the service chain with an incoming interface, a source subnetwork, or a destination subnetwork; and instantiate the service chain in a first network node of the service chain.

14. The one or more non-transitory computer readable storage media of claim 12, wherein the particular network node gathered the respective service attributes from the other network nodes of the plurality of network nodes using the underlay routing protocol.

15. The one or more non-transitory computer readable storage media of claim 10, wherein the instructions further cause the processor to:

obtain a selection of a particular link of the plurality of links, wherein the particular link connects two network nodes of the plurality of network nodes; and in response to the selection, display an overlay including network names and addresses of the two network nodes.

16. A method comprising:

using Border Gateway Protocol Link-State, from a particular network node of a plurality of network nodes in a network fabric configured for segment routing, obtaining network topology information of the plurality of network nodes including segment identifiers of the plurality of network nodes, wherein the particular network node gathered the network topology information from other network nodes of the plurality of network nodes using an underlay routing protocol, the network topology information including respective service attributes corresponding to respective ones of the plurality of network nodes, wherein the respective service attributes represent respective types of services provided by the respective ones of the plurality of network nodes;

based on the network topology information, generating a visualization of a topology of the network fabric including the plurality of network nodes, a plurality of links connecting the plurality of network nodes, and indications of the respective types of services;

obtaining an ordered selection of the respective types of services; and modifying the visualization of the topology of the network fabric to display the respective types of services as a service chain.

17. The method of claim 16, further comprising:

associating the service chain with an incoming interface, a source subnetwork, or a destination subnetwork; and instantiating the service chain in a first network node of the service chain.

18. The method of claim 16, wherein the particular network node gathered the respective service attributes from the other network nodes of the plurality of network nodes using the underlay routing protocol.

19. The method of claim 16, further comprising:

obtaining a selection of a particular link of the plurality of links, wherein the particular link connects two network nodes of the plurality of network nodes.

20. The method of claim 19, further comprising:

in response to the selection, displaying an overlay including network names and addresses of the two network nodes.

* * * * *